(12) United States Patent
Yamazaki (10) Patent No.: US 6,633,409 B1
(45) Date of Patent: Oct. 14, 2003

(54) IMAGE PROCESSING APPARATUS

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/377,823

(22) Filed: Aug. 20, 1999

(30) Foreign Application Priority Data

Aug. 20, 1998 (JP) ............................................. 10-233922

(51) Int. Cl.[7] ............................ H04N 1/407; H04N 1/56
(52) U.S. Cl. ........................ 358/1.9; 358/3.23; 358/521; 358/525
(58) Field of Search ................................ 358/1.9, 3.23, 358/3.26, 504, 521, 525, 518

(56) References Cited

U.S. PATENT DOCUMENTS 5,719,956 A * 2/1998 Ogatsu et al. ............... 358/518
5,798,842 A   8/1998 Yamazaki

* cited by examiner

*Primary Examiner*—Scott Rogers
(74) *Attorney, Agent, or Firm*—Birch, Stewart, Kolasch & Birch, LLP (57) ABSTRACT

The image processing apparatus has nonlinear processing device that performs nonlinear processing on a digital color signal. The nonlinear processing device comprises gray region discriminating device which discriminates whether the digital color signals are present in a gray proximate region including gray signals and region correspondence nonlinear processing device which performs the nonlinear processing differently in accordance with cases where the digital color signals are discriminated as signals inside the gray proximate region being present in the vicinity of the gray signals or as signals outside the gray proximate region being not present in the vicinity of the gray signals by the gray region discriminating device. The image processing apparatus realizes a three-dimensional retrieving table (3D-LUT) which does not cause subtle variations different from its aim in the output signals only with a small addition of memory capacity to the ordinary memory, ensuring that the gray reproduction can be performed consistently and that photographic prints of high quality are produced in succession.

9 Claims, 6 Drawing Sheets

IMAGE PROCESSING APPARATUS

BACKGROUND OF THE INVENTION

This invention relates to an image processing apparatus, particularly one that is useful in reading the images on photographic films (which are hereinafter referred to simply as "films") to produce photographic prints in succession, more particularly one that is useful in reproducing a gray in a stable manner to produce photographic prints of high quality in succession.

Heretofore, the images recorded on films such as negatives and reversals have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a finished print. The printer operating on this principle has been commercialized as a digital printer.

In the digital printer, images can be processed as digital image data to determine the exposure conditions for printing. Hence, it is capable of performing various image processing operations such as the correction of washed-out highlights or flat (dull) shadows due to the taking of pictures with backlight or an electronic flash, sharpening and the correction of color or density failures and this enables the production of prints of the high quality that has been impossible to achieve by the conventional direct exposure. Further, not only the assembling of images and the splitting of a single image into plural images but also the composition of characters can be performed by processing the image data and, as a result, prints can be outputted after various editing and/or processing operations have been performed in accordance with specific uses.

Outputting images as prints is not the sole capability of the digital printer; the image data can be supplied into a computer and the like and stored in recording media such as a floppy disk; hence, the image data can be put to various non-photographic uses.

Having these features, the digital printer is basically composed of an image input unit having a scanner (image reading apparatus) and an image processing apparatus, and an image output unit having a printer (image recording apparatus) and a processor (developer).

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film (as image data signals) after being optionally subjected to various image processing schemes.

In the image processing apparatus, image processing conditions are set on the basis of the image data captured with the scanner and image processing as determined by the thus set conditions is performed on the captured image data and the resulting output image data for image recording (i.e., exposure conditions) are sent to the printer.

In the printer, if it is of a type that relies upon exposure by scanning with an optical beam, the optical beam is modulated in accordance with the image data from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Then, in the processor, development and other processings as determined by the light-sensitive material are performed to produce a print reproducing the image that was recorded on the film.

The image processing schemes described above generally include color balance adjustment, contrast correction (toning), lightness correction, dodging (compression/extension of the dynamic range of densities), chroma correction and sharpening. These schemes are performed by known methods comprising appropriate combinations of arithmetic operations with operation expressions, processing operations with retrieving tables, namely, look-up tables (LUTs), matrix (MTX) operations, processing operations with filters and the like. For example, color balance adjustment, lightness correction and contrast correction are performed with LUTs, while chroma correction is performed by MTX operations. Sharpening and dodging are performed in other processing units.

In three dimensional retrieving tables, namely, 3D (3 dimensional)-LUTs which have been used in the conventional image processing technology, output signal values are held corresponding to respective vertexes of a cube constructed with planes perpendicular to R, G and B axes and then output signal values, namely, nonlinear transformation values by LUTs, at a position are obtained by subjecting the thus held output signal values corresponding to respective vertexes to interpolation operations by means of weights in accordance with the position within the cube. However, a problem with such processing is that input signal values of "gray" may cause a subtle variations different from its aim in an output signal, unless sufficient number of planes perpendicular to R, G and B axes are prepared.

In order to solve the problem, the number of planes perpendicular to R, G and B axes may be increased for preparing exquisite cubes. However, another problem will come out in this case such that output signal values corresponding to respective vertexes of huge values of cubes must be held.

SUMMARY OF THE INVENTION

The present invention (hereinafter called as the invention) has been accomplished under these circumstances and has as an object providing an image processing apparatus that realizes a three-dimensional retrieving table (3D-LUT) which does not cause subtle variations different from its aim in output signals only with a small addition of memory, capacity to the ordinary memory thereby ensuring that the gray reproduction can be performed consistently and that photographic prints of high quality are produced in succession.

The stated object of the invention can be attained by an image processing apparatus having nonlinear processing means for performing nonlinear processing on digital color signals, the nonlinear processing means comprising: gray region discriminating means for discriminating whether the digital color signals are present in a gray proximate region including gray signals; and region correspondence nonlinear processing means for performing the nonlinear processing differently in accordance with cases where the digital color signals are discriminated as signals inside the gray proximate region being present in the proximity of the gray signals or as signals outside the gray proximate region being not present in the proximity of the gray signals by the gray region discriminating means.

It is preferable that, in the image processing apparatus, the region correspondence nonlinear processing means comprises first processing means for calculating endpoints of a first interpolation unit region including the signals inside the gray proximate region as well as first interpolation weights of the signals inside the gray proximate region; second processing means for calculating endpoints of a second interpolation unit region including the signals outside the gray proximate region as well as second interpolation weights of the signals outside the gray proximate region; and interpolation processing means for performing interpolation processing using the endpoints of the first interpolation unit region and the first interpolation weights which have been calculated by the first processing means to obtain nonlinear processing output values of the signals inside the gray proximate region or for performing another interpolation processing using the endpoints of the second interpolation unit region and the second interpolation weights which have been calculated by the second interpolation processing means to obtain nonlinear processing output values of the signals outside the gray proximate region.

It is also preferable that the first processing means comprises: first address calculating means for calculating first address output values of the signals inside the gray proximate region as data of the endpoints of the first interpolation unit region; first interpolation weight calculating means for calculating the first interpolation weights using the signals inside the gray proximate region; and first storing means for storing the first address output values obtained by the first address calculating means, and wherein the second processing means comprises: second address calculating means for calculating second address output values of the signals outside the gray proximate region as data of the endpoints of the second interpolation unit region; second interpolation weight calculating means for calculating the second interpolation weights using the signals outside the gray proximate region; and second storing means for storing the second address output values obtained by the second address calculating means.

It is further preferable that the interpolation processing means performs the interpolation processing using the first address output values stored in the first storing means and the first interpolation weights calculated by the first interpolation weight calculating means when the digital color signals are discriminated as being present in the gray proximate region or perform the interpolation processing using the second address output values stored in the second storing means and the second interpolation weights calculated by the second interpolation weight calculating means when the digital color signals are discriminated as being not present in the gray proximate region, thereby obtaining the nonlinear processing output values.

It is also further preferable that the nonlinear processing means is three dimensional retrieving table transforming means for performing the nonlinear processing using a three dimensional retrieving table.

It is still further preferable that the digital color signals comprise three primary color signals of red(R), green(G) and blue(B), wherein the interpolation processing means holds output signal values corresponding to each vertex of an cube composed of planes perpendicular to red(R), green(G) and blue(B) axes as data of the endpoints of the interpolation unit region in the three dimensional retrieving table, performs an interpolation operation of the output signal values corresponding to each vertex with interpolation weights corresponding to a position within the cube and wherein the cube in proximity of the gray signals, which is present inside the gray proximate region is rendered smaller in size than the cube in a periphery of the three dimensional retrieving table, which is present outside the gray proximate region. Moreover, it is preferable that a side of the cube in the proximity of the gray signals is half or less in the size of the side of the cube in the periphery. Furthermore, it is preferable that the gray proximate region in the proximity of the gray signals is a region where total length from the gray signals as a center in each direction of the red, the green and the blue axes is within 5 pieces of cubes in the periphery. Still furthermore, it is also preferable that the nonlinear processing means performs at least one nonlinear processing of color balance adjustment, lightness correction and contrast correction.

DETAILED DESCRIPTION OF THE INVENTION

An image processing apparatus according to the invention is hereunder described in detail with reference to the preferred embodiments shown in the accompanying drawings.

Figure 1:
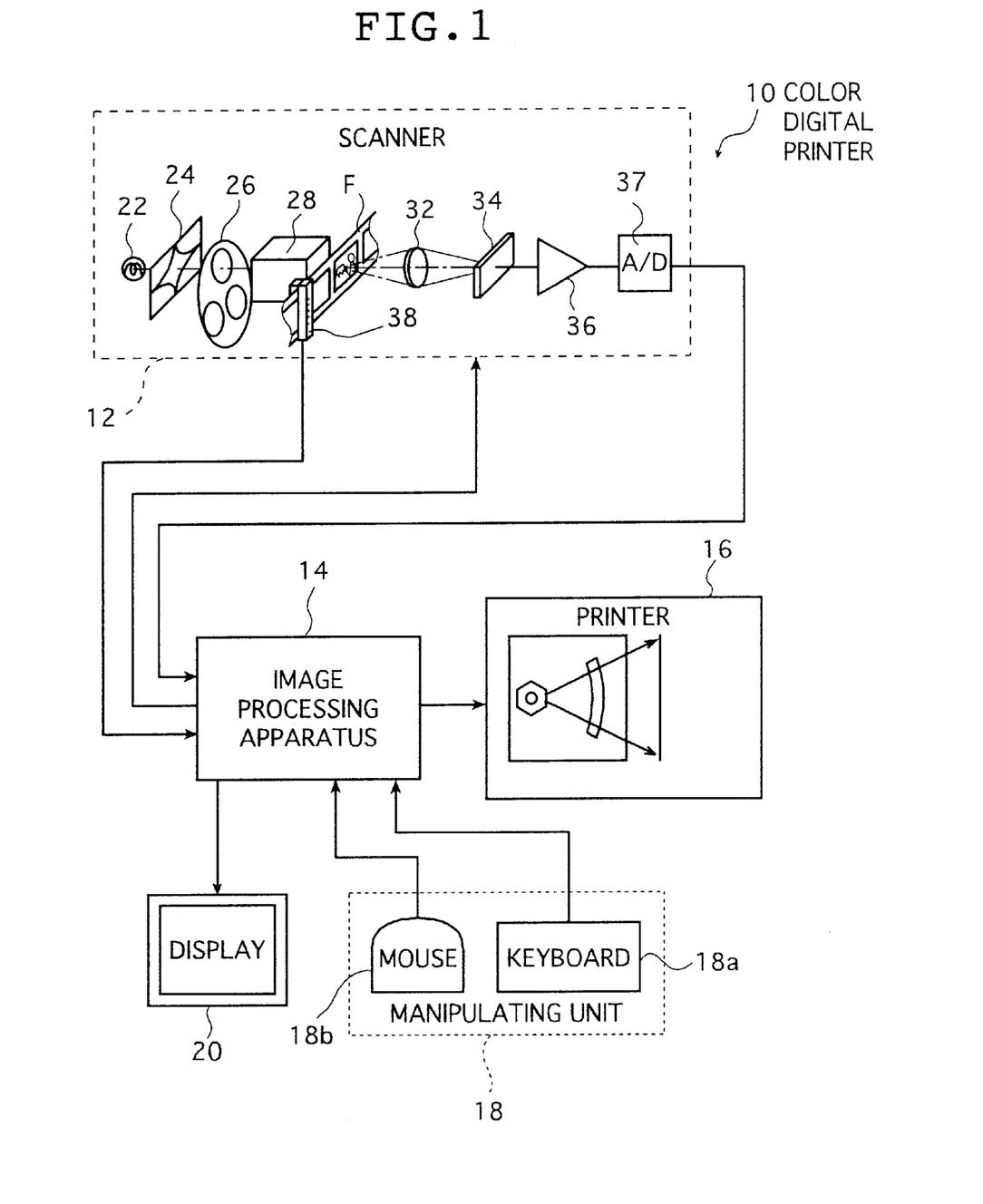
FIG. 1 is a block diagram showing the general layout of a color digital printer including an image processing apparatus according to an embodiment of the invention.

FIG. 1 is a block diagram showing the general layout of a color digital printer including an image processing apparatus according to an embodiment of the invention.

The color digital printer indicated by 10 in FIG. 1 comprises a film reading apparatus (scanner) 12 that reads photoelectrically the image on a film (color negative film) F, an image processing apparatus 14 that performs image processing on the thus read image data (image information) and with which the color digital printer 10 as a whole according to the embodiment under consideration is manipulated and controlled, and a printer 16 which performs imagewise exposure of a light-sensitive material (photographic paper) with light beams modulated in accordance with the image data delivered from the image processing apparatus 14 and which performs development and other necessary processing to produce a finished print (photograph).

Connected to the image processing apparatus 14 are a manipulating unit 18 having a keyboard 18a and a mouse 18b for inputting (setting) various conditions, selecting and commanding a specific processing scheme and entering a command and so forth for effecting color/density correction, as well as a display 20 for representing the image captured with the scanner 12, various manipulative commands and pictures for setting and registering various conditions.

The above-mentioned scanner 12 is an apparatus with which the images recorded on the film F are read photoelectrically frame by frame. It comprises a light source 22, a variable diaphragm 24, a color filter assembly 26 that has three color (R, G, B) filters for separating the image into three primary colors R (red), G (green) and B (blue) and which rotates to have either one of these color filters inserted into the optical path, a diffuser box 28 which diffuses the reading light incident on the film F so that it becomes uniform across the plane of the film F, an imaging lens unit 32, a CCD sensor 34 which reads the image in one frame of the film, an amplifier 36, an analog/digital (A/D) converter 37 and a bar code reader 38 that optically reads DX codes recorded on the edges of the film F.

In the illustrated color digital printer 10, dedicated carriers are available that can be loaded into the body of the scanner 12 in accordance with the type or the size of the film used (e.g. whether it is a negative or reversal film of 240 or 135 size), the format of the film (e.g. whether it is a strip or a slide), the kind of treatment to be done (e.g. whether it is trimming) or other factor. By interchanging carriers, the color digital printer 10 can be adapted to process various kinds of films in various modes. The images (frames) that are recorded on the film F and which are subjected to the necessary procedure for print production are transported and held in a specified reading position by means of the carrier.

The bar code reader 38 is provided on the carrier on the side upstream of the specified reading position as seen in the direction of film transport. It reads DX codes optically as the film F is transported to the specified reading position. If the film F is of 240 size, the bar code reader 38 also reads magnetic information from magnetic tracks.

Figure 2A:
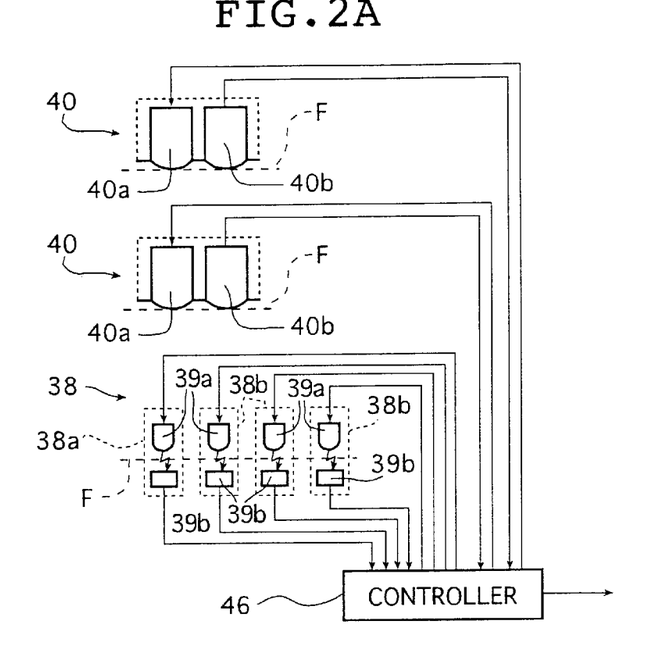
FIG. 2A is an illustration of embodiments of a bar code reader and magnetic heads used in a scanner shown in FIG. 1.
Figure 2B:
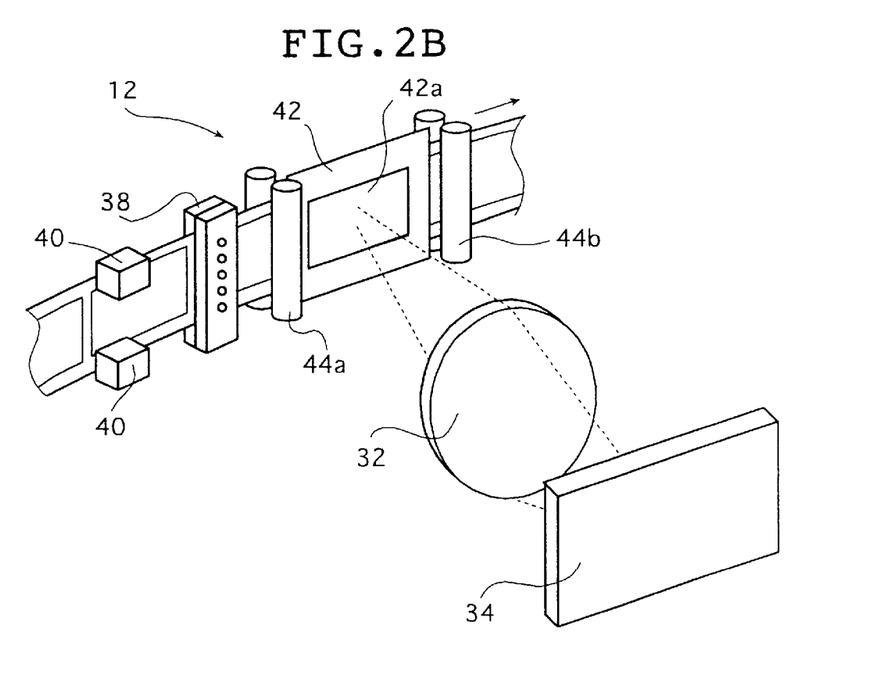
FIG. 2B is a perspective view showing diagrammatically an embodiment of the essential part of the scanner.

FIGS. 2A and 2B show details of the arrangement of the scanner 12 and the bar code reader 38 which is provided on the scanner 12 in the color digital printer 10 according to the embodiment under consideration.

The film F is transported intermittently by means of two transport roller pairs 44a and 44b that are provided upstream and downstream, respectively, of a carrier mask 42 as seen in the direction of film transport. The carrier mask 42 has an opening 42a that determines the reading position and size of the film F. The bar code reader 38 has one optical sensor 38a serving as a bar code reader head and a plurality of other optical sensors 38b; these optical sensors are arranged across the transport width of the film F near the upstream side of the transport roller pair 44a which is provided upstream of the carrier mask 42 as seen in the direction of film transport. Each of the optical sensors 38a and 38b consists of one light emitting portion 39a and one light receiving portion 39b that are spaced by the film F (indicated by a dashed line in FIG. 2A) which is transported in the film transport path.

The optical sensor 38a is provided at an end of the width of the film F and used to read optical information such as DX codes; it is adapted to detect not only perforation holes P in the film F but also its leading and trailing edges. The optical sensors 38b are provided in a face-to-face relationship with the middle of the width of the film F and used to detect the picture (image) area GA of each of the images recorded on the film F and the non-picture area between picture areas, or so-called frames. Briefly, the optical sensors 38b are used to assist in automatic transport of the film F and continuous transport and reading of more than one frame using line sensors to be described later in this specification.

The magnetic heads 40 are provided on a carrier that is compatible with a 240 film F. As shown in FIG. 2B, they are provided in a face-to-face relationship with magnetic tracks MT on both lateral edges of the film F in positions upstream of the bar code reader 38. Each magnetic head 40 comprises a record head 40a for recording magnetic information on the magnetic tracks MT and a read head 40b for reading the magnetic information recorded on the magnetic tracks MT.

The bar code reader 38 and magnetic heads 40 having the structures described above are connected to a controller 46 provided in the scanner 12. The controller 46 is also connected to motors (not shown) for driving the transport roller pairs 44a and 44b on the carrier, various sensors (not shown) and solenoids (not shown) for opening or closing the mask (film holder) 42. As the film F is transported or successive frames are fed by means of the transport roller pairs 44a and 44b under the control of the controller 46, the bar code reader 38 reads optical information such as DX codes from the film F. At the same time, the record head 40a in each magnetic head 40 records the magnetic information from the controller 46 on the magnetic tracks MT of the Film F as it receives information from the image processing apparatus 14 whereas the read head 40b of each magnetic head 40 reads the magnetic information recorded on the film F.

The thus read optical and magnetic information are sent to the image processing apparatus 14 via the controller 46. The DX codes as read with the bar code reader 38 are digitized or encoded with the controller 46 and then sent to the image processing apparatus 14 where they are acquired as optical information indicating the type of the film used and the name of its manufacturer.

The reading of optical information with the bar code reader 38 and the acquisition of magnetic information with the magnetic heads 40 are preferably performed as the film is transported or successive frames are fed during prescan for coarse reading of the image on the film F. However, this is not the sole case of the invention and optical and magnetic information may be read or acquired during fine scan or, alternatively, they may be read with a separate dedicated machine. It should be noted that if a bar code reader is to be used, the bar codes and the image in one frame of the film F are not read simultaneously but the bar codes in a frame and the image in a different frame are read simultaneously.

After the optical information (and magnetic information) in a frame of the film F has been read with the bar code reader 38 (and the magnetic heads 40), the image in the same frame is read with the scanner 12. Reading light issued from the light source 22 has its quantity adjusted by the variable diaphragm 24, passes through the color filter assembly 26 to be adjusted in color and is diffused by passage through the diffuser box 28. The reading light with evenly diffused light quantity is then incident on a frame of the film F held in the specified reading position by the carrier (and which is hereunder typified by a 135 film) and transmitted through the frame to produce projected light bearing the image in the frame as recorded on the film F.

The projected light from the film F is focused by the imaging lens unit 32 to form a sharp image on the light-receiving plane of the CCD sensor 34. After photoelectric reading of the image with the CCD sensor 34, the output signals from the CCD sensor 34 are amplified with the amplifier 36, converted to digital form in A/D converter 37 and sent to the image processing apparatus 14. The CCD sensor 34 is typically an area CCD sensor having 1380×920 pixels.

In the scanner 12, such image reading is performed three times, with the respective color filters in the color filter assembly 26 being inserted in succession so that the image in one frame is read as separations of three primary colors R, G and B.

In the color digital printer 10 of the embodiment under consideration, image reading (fine scan) for outputting a print P is preceded by prescan which reads the image at low resolution for determining the image processing conditions and so forth. Therefore, a total of six image reading processes are performed for one frame.

In the embodiment under consideration, the scanner 12 uses an area CCD sensor and reads the image as separations of three primary colors of the projected light that are obtained by the color filter assembly 26. This is not the sole case of the scanner that can be used in the invention and a scanner indicated by 50 in FIG. 3A may be substituted; it uses a three-line CCD sensor assembly 48 (consisting of three line sensors 48R, 48G and 48B) that are adapted for reading the three primary colors R, G and B and performs image reading by slit scan which reads the images on the film F as it is transported for scan by means of the transport roller pairs 44a and 44b on the carrier. Since the scanner 50 is capable of simultaneous reading of three colors R, G and B, each of prescan and fine scan need be performed only once and regardless of the type of the film F (e.g. whether it is a piece or strip of 135 size film or a 240 size film within a cartridge), the image reading process can be simplified by reciprocal movements. Prescan may be performed by reading all frames in succession.

Figure 3A:
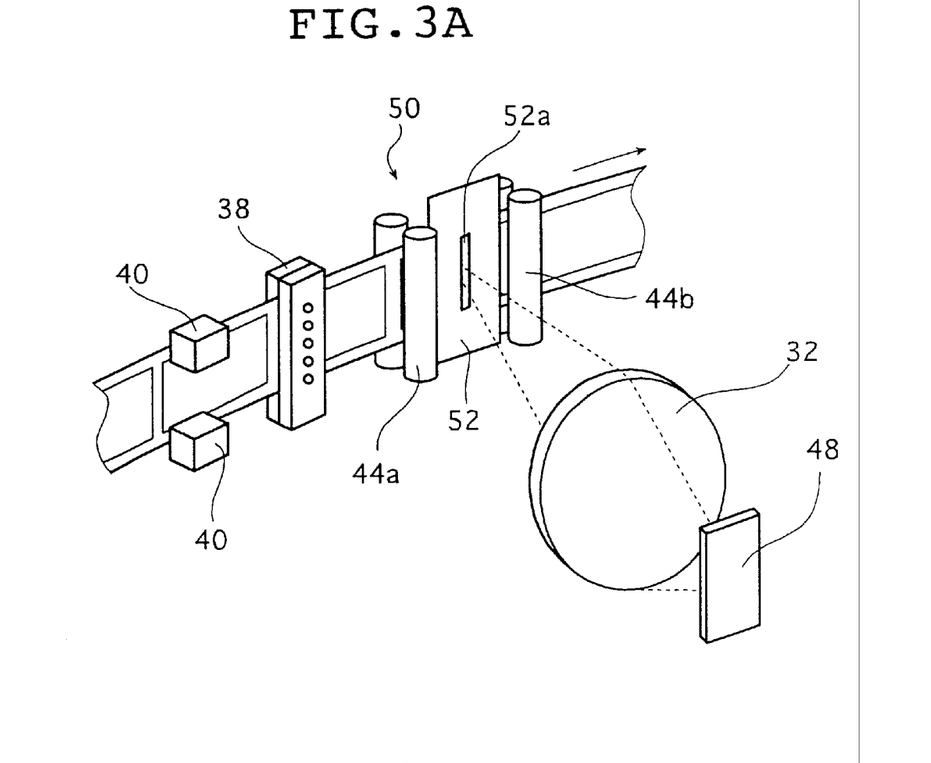
FIG. 3A is a perspective view showing diagrammatically another embodiment of the essential part of the scanner shown in FIG. 1.

The scanner 50 shown in FIG. 3A has essentially the same structure as the scanner 12 shown in FIGS. 1 and 2A and need not be described in detail. Suffice it here to say that the scanner 50 which performs image reading by slit scan substitutes a slit plate 52 (which may be the top cover of the carrier) having an elongated slit 52a for the film holder (mask) 32 and uses the line CCD sensor assembly 48 in place of the area CCD sensor 34; the color separating filter 26 is replaced by a light adjusting filter (not shown) with which the quantity of the light issuing from the light source 22 is adjusted for each color component.

Figure 3B:
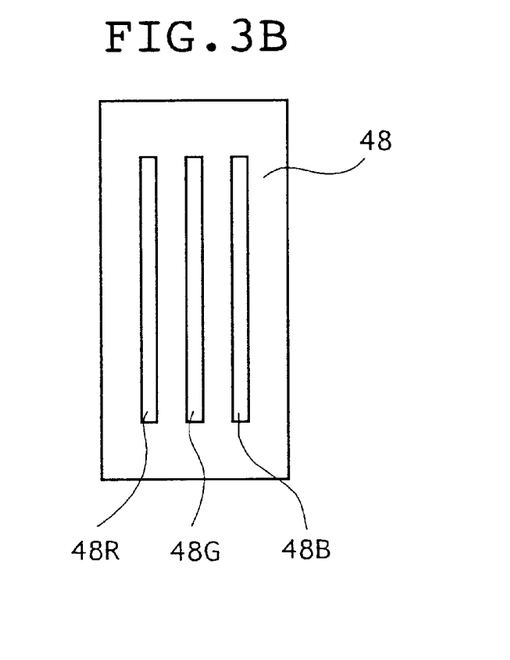
FIG. 3B is a plan view showing diagrammatically an embodiment of a line CCD sensor assembly.

The line CCD sensor assembly 48 is a three-line reading sensor which performs reading of three primary colors R, G and B almost simultaneously as separations of the projected light from the film F and has three line sensors 48R, 48G and 48B for reading R, G and B lights, respectively. Each line sensor is a CCD array arranged in one line the same number of CCD elements that correspond to the same number of reading pixels. On the three CCD arrays, R, G and B filters are superposed to construct the line sensors 48R, 48G and 48B, respectively.

The color digital printer 10 of the embodiment under consideration is supplied with the image data for the image processing apparatus 14 from the scanner 12 that performs photoelectric reading of the image recorded on films such as negatives and reversals. However, the scanners 12 and 50 are not the sole examples of the source of supplying image data to the image processing apparatus 14 and various kinds of image reading apparatuses, imaging devices and image data storage devices may be employed, as exemplified by an image reading apparatus that reads the image on a reflection original, a digital camera or a digital video camera, communication devices such as a local area network (LAN) and a computer communication network (an on-line service network), and storage media such as memory cards and MO (magneto-optical) media.

As already mentioned, the output signals (image data) from the scanner 12 are fed into the image processing apparatus 14.

Figure 4:
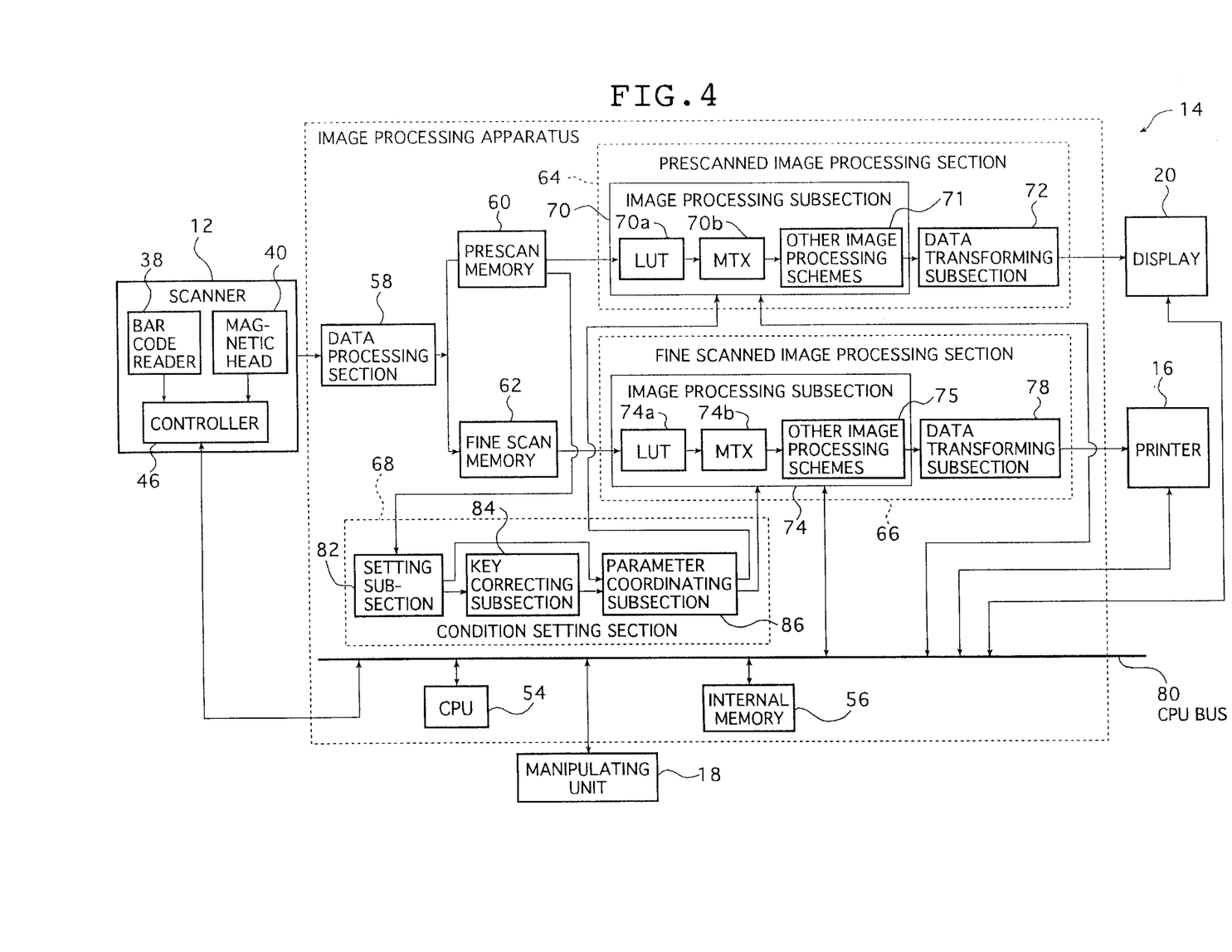
FIG. 4 is a block diagram for an embodiment of an image processing apparatus shown in FIG. 1.

FIG. 4 is a block diagram for the image processing apparatus 14 (which is hereunder referred to simply as "processing apparatus 14"). The processing apparatus 14 generally comprises a control line and an image processing line. The control line has a CPU 54 that implements and controls the image processing method of the invention and which also controls and manages, both partly and wholly, the color digital printer 10 including the scanner 12, processing apparatus 14, printer 16 and display 20, as well as an internal memory 56 for storing the information necessary to implement the image processing method of the invention and operate the color digital printer 10. The image processing line has a data processing section 58, a prescan (frame) memory 60, a fine scan (frame) memory 62, a prescanned image processing section 64, a fine scanned image processing section 66 and a condition setting section 68.

The processing apparatus 14 also includes devices for determining the stop-down value of the variable diaphragm 24 and the charge storage time of the CCD sensor 34 during fine scan. In the control line, the manipulative unit 18 and the display 20 are controlled by the CPU 54 and connected to related sites via a CPU bus 80.

In the image processing line, the R, G and B signals outputted from the scanner 12 are sent to the data processing section 58 where they are subjected to various processing schemes such as log conversion, DC offset correction, dark correction and shading correction, whereupon digital image data is obtained. Of the digital imagedata, prescanned (image) data is stored in the prescan memory 60 and fine scanned (image) data is stored in the fine scan memory 62.

The prescanned data and the fine scanned data are essentially the same data except for resolution (pixel density) and signal level.

The prescanned data stored in the prescan memory 60 is processed in the prescanned image processing section 64 whereas the fine scanned data stored in the fine scan memory 62 is processed in the fine scanned image processing section 66.

The prescanned image processing section 64 comprises an image processing subsection 70 and an image data transforming subsection 72 whereas the fine scanned image processing section 66 comprises an image processing subsection 74 and an image data transforming subsection 78.

In accordance with the image processing conditions set by the condition setting section 68 to be described later, preset image processing conditions are read out of the internal memory 56 by the CPU 54. The image processing subsection 70 (which is hereunder referred to simply as "processing subsection 70") in the prescanned image processing section 64 and the image processing subsection 74 (which is hereunder referred to simply as "processing subsection 74") in the fine scanned image processing section 66 are the sites where the image (image data) read by the scanner 12 are subjected to specified image processing schemes in accordance with either the image processing conditions read by the CPU 54 or the image processing conditions that are set in the condition setting section 68 to which the conditions read by the CPU 54 have been sent. The two processing subsections 70 and 74 perform essentially the same operations except that the image data to be processed have different pixel densities.

The image processing schemes to be performed in the processing subsections 70 and 74 are generally exemplified by color balance adjustment, contrast correction (toning), lightness correction, dodging (compression/extension of the dynamic range of densities), chroma correction and sharpening. As already mentioned, these schemes are performed by known methods comprising appropriate combinations of arithmetic operations with operation expressions, processing operations with LUTs, MTX operations, processing operations with filters and so forth. In the illustrated example, color balance adjustment, lightness correction and contrast correction are performed with LUT transforming devices 70a and 74a, while chroma correction is performed with MTX operating devices 70b and 74b. Other schemes such as sharpening and dodging are performed in blocks 71 and 75 in accordance with operator's instructions, image data and so forth.

Figure 5:
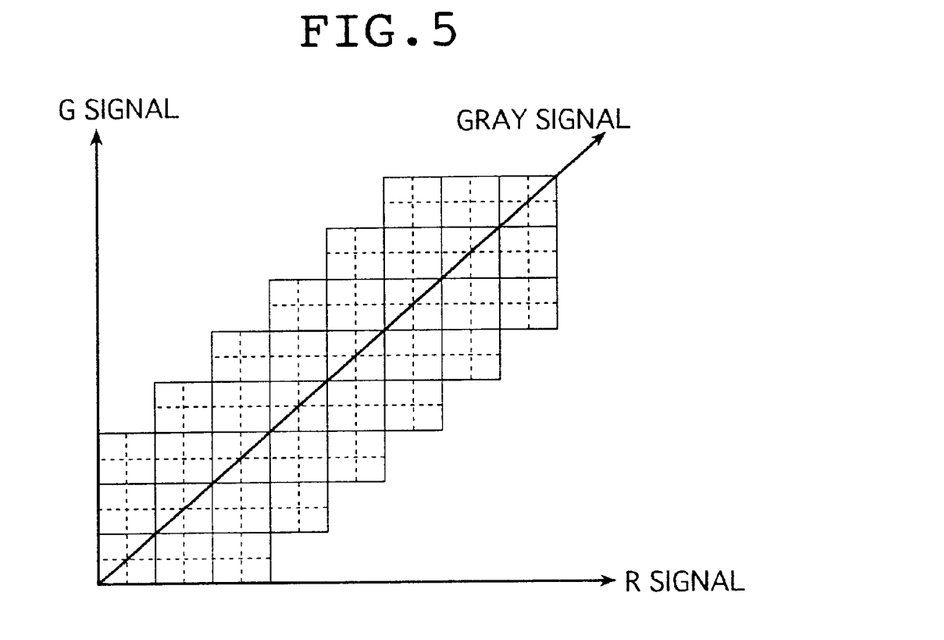
FIG. 5 is an illustration (G-R axis) showing an example of a divided status of unit cubes for interpolation operations in the proximity of gray axis of 3D-LUT used in the invention.
Figure 6:
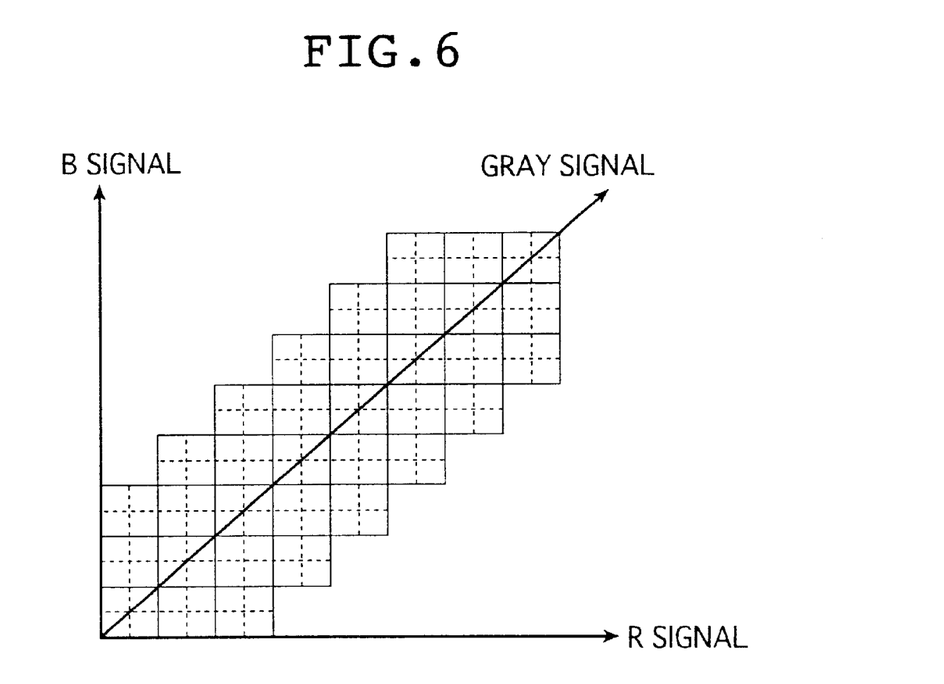
FIG. 6 is an illustration (B-R axis) showing an example of a divided status of the unit cubes for the interpolation operations in the proximity of the gray axis of 3D-LUT used in the invention.
Figure 7:
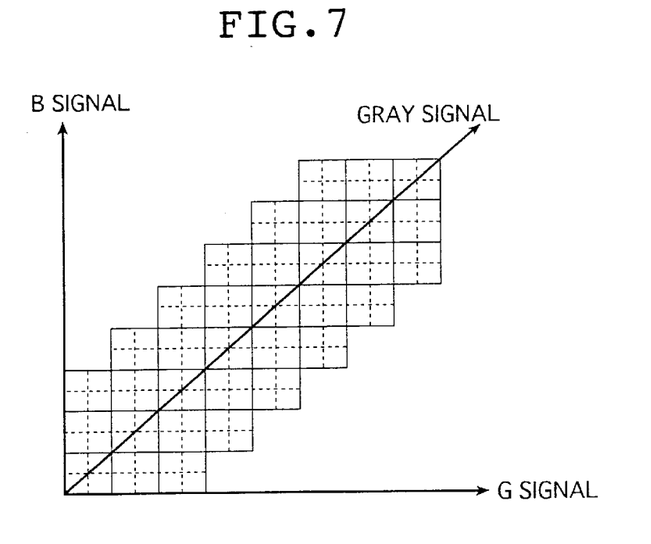
FIG. 7 is an illustration (B-G axis) showing an example of a divided status of the unit cubes for the interpolation operations in the proximity of the gray axis of 3D-LUT used in the invention.
Figure 8:
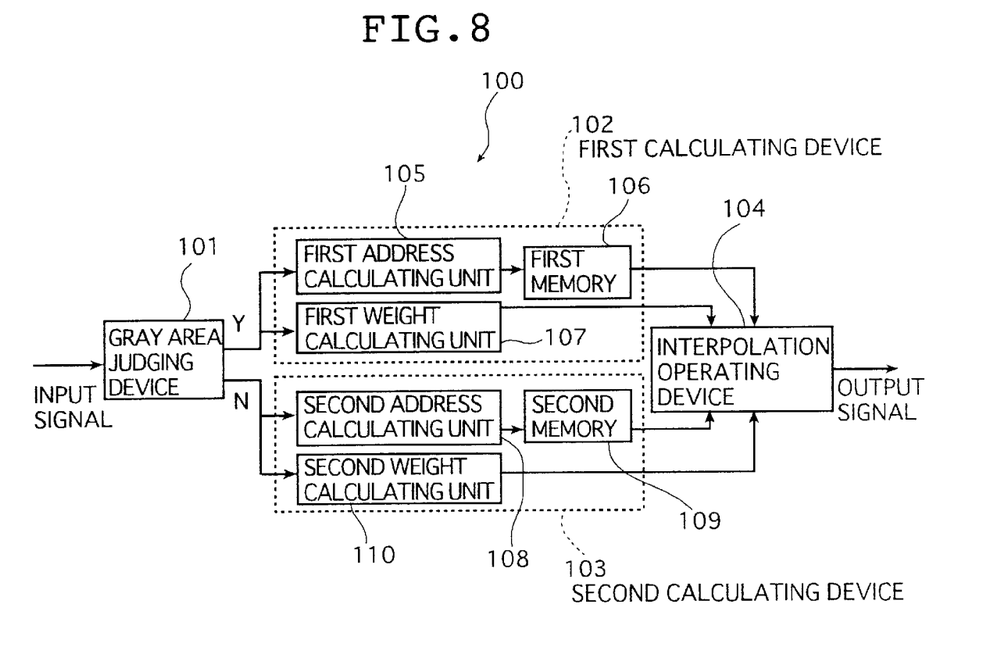
FIG. 8 is a block diagram showing an embodiment of a nonlinear transforming device constructing an LUT conversion device in a processing subsection in the image processing apparatus shown in FIG. 4.

In the image processing apparatus 14 of the embodiment under consideration, the image processing described above that is to be performed in the processing subsections 70 and 74 is modified such that each of three dimensional retrieving tables, namely, 3D-LUTs (three dimensional look-up tables) used in the LUT transforming devices 70a and 74a responsible for nonlinear processing such as color balance adjustment is configured in a special manner as shown in FIGS. 5 to 7, and the LUT transforming devices 70a and 74a themselves are configured in a special manner as shown in FIG. 8, to prevent the occurrence of extraordinary variations in gray signals.

In other words, as examples shown in FIGS. 5 to 7, LUTs used in the invention are utilized for LUT transforming devices 70a and 74a and are 3D-LUTs composed of three primary colors of R, G and B. These 3D-LUTs have essentially the same structures as those of conventional 3D-LUTs composed of R, G and B axes but differ from the conventional ones in that the size of the unit cube (unit lattice) constituting an interpolation unit region in the proximity of the gray region including the gray axis itself (gray signals), that is, the gray proximate region is rendered smaller than that in other regions, that is, in the periphery of the 3D-LUT, for example, one eighth or less the size (volume) of the unit cube in other regions, that is, half or less the length of a side of the unit cube in other regions to increase the density of the unit cubes in the proximity of the gray axis to a higher level than that in the region apart from the gray axis, thereby increasing accuracy of interpolation operations of input signals (i. e., digital color signals) which are signals inside the gray proximate region being present in the proximity of the gray region including the gray axis itself.

In the illustration, as the proximity of the gray region (the gray proximate region) where the unit cube is one eighth the size of the conventional one, the region composed of five pieces of unit cubes in each direction of three axes, namely R, G and B axes, with the unit cube (in the same size as the unit cube in the periphery) of the conventional 3D-LUT around the gray axis as the center placed in the center, more particularly, two pieces each on opposite sides of one cube disposed on the gray axis in each direction of these three axes is set.

In the invention, the proximity of the gray region where the unit cube is smaller in size than usual is not limited to the above described region. A specified region with the gray axis placed in its center may be optionally selected in accordance with accuracy of gray reproduction, accuracy of color reproduction, accuracy of the adopted 3D-LUT (number of lattice points or endpoints, namely, size of unit cube in the periphery, downsized size of unit cube in the proximity of the gray axis and the like) and so forth. Moreover, the region is also optionally selected from a circle, a polygon and the like in a sectional form perpendicular to the gray axis. As an illustrated example, the region is most preferably composed of 5 pieces of unit cubes of the 3D-LUT with a conventional size in each direction of three axes with the gray axis placed in their center.

Furthermore, the ratio of sizes (volumes) of the unit cubes in the proximity of the gray axis and in the periphery is not limited to any specified number in the invention and may optionally be determined taking various factors into account; however, for example, the ratio is most preferably 1/8 as illustrated.

In FIG. 8, a nonlinear processing device 100 composing the above described LUT transforming devices 70a and 74a and interpolation operation processing to be performed therein are shown in detail.

The nonlinear processing device 100 constitutes the LUT transforming devices 70a and 74a which performs the nonlinear processing schemes such as color balance adjustment, lightness correction, contrast correction and the like using 3D-LUTs such as those shown in FIGS. 5 to 7. The nonlinear processing device 100, as shown in FIG. 8, comprises a gray region judging device 101, a first calculating device 102, a second calculating device 103 and an interpolation operating device 104. The first calculating device 102, the second calculating device 103 and the interpolation operating device 104 constitute a region correspondence nonlinear processing device which performs a nonlinear transformation (LUT transformation) differently corresponding to respective regions which are judged by the gray region judging device 101.

In the nonlinear processing device 100 shown in FIG. 8, the gray region judging device 101 discriminates more accurately than before using each pixel whether the pixel of interest belongs to the proximity of the gray region or not, namely, whether input signals (digital color signals) belong to the proximity of the gray region or not. The base for the above described discrimination is not limited in a specific manner and may be set in accordance with the establishment of the proximity of the gray region. For example, a discrimination method of comparison with the threshold value preset in accordance with the establishment of the proximity of the gray region or the like may preferably be used.

The first calculating device 102 calculates data necessary for interpolation operations to be performed on values of input signals subjected to the LUT transformation, for example, the address (position) of endpoints in the interpolation unit region including the input signals and position weights of the input signals, when the gray region judging device 101 discriminates Y (Yes), namely, the gray region judging device 101 discriminates that the input signals belong to the proximity of the gray region. The first calculating device 102 comprises a first address calculating unit 105, a first memory 106 and a first weight calculating unit 107.

The first address calculating unit 105 calculates, from upper bits of the input signals which belong to the proximity of the gray region (hereinafter called as signals inside the gray proximate region), interpolation unit region including these signals inside the gray proximate region such as, in the illustrated 3D-LUT, endpoints (lattice points) of the unit cube including the signals inside the gray proximate region, preferably all endpoints necessary for interpolation operations, such as eight vertexes of this unit cube as well as reads values of these eight vertexes subjected to the LUT nonlinear transformation from the 3D-LUT stored in the first memory 106 to send them to the first memory 106 for storing them. As shown in FIGS. 5 to 7, the unit cube having eight vertexes calculated in the first address calculating unit 105 ranges from the same size of the unit cube in the periphery which is shown in solid lines to one eighth the size of the unit cube in the periphery which is shown in dotted lines to be capable of reproducing highly accurate gray.

The first memory 106 constitutes 3D-LUTs adaptable to the proximity of the gray region including the gray axis as well as reads and stores 3D-LUT values which have been calculated with the first address calculating unit 105 and stored in addresses of all eight endpoints (eight lattice points), namely, LUT values subjected to the nonlinear transformation. The weight calculating unit 107 calculates the position of the signals inside the gray proximate region in the cube to be subjected to interpolation including the signals inside the gray proximate region as weights adaptable to respective endpoints of this cube from the position (address) of the signals inside the gray proximate region and all the endpoints (addresses) of the cube to be subjected to interpolation including the position of these signals.

The second calculating device 103 calculates data necessary for interpolation operations to be performed on values of input signals subjected to the LUT transformation, for example, the address (position) of endpoints in the interpolation unit region including the input signals and position weights of the input signals, when the gray region judging device 101 judges N (No), namely, the gray region judging device 101 discriminates that the input signals do not belong to the proximity of the gray region. The second calculating device 103, in the same manner as in the first calculating device 102, comprises a second address calculating unit 108, a second memory 109 and a second weight calculating unit 110.

The second address calculating unit 108, the second memory 109 and the second weight calculating unit 110 of the second calculating device 103 have essentially the same structures as those of corresponding units in the first calculating device 102, namely, the first address calculating unit 105, the first memory 106 and the first weight calculating unit 107 except for data amounts or densities to be subjected. Therefore, detailed explanation on these units of the second calculating device 103 is omitted.

The second address calculating unit 108 calculates, from upper bits of the input signals which do not belong to the proximity of the gray region (hereinafter called as signal outside the gray proximate region), eight endpoints (eight lattice points) of the unit cube which will be interpolation unit regions including these signals outside the gray region essentially in the same manner as in the first address calculating unit 105, reads values after subjected to LUT nonlinear transformation of these eight vertexes from the 3D-LUT stored in the second memory 109 and sends them to the second memory 109 to be stored therein. When the size of the unit cube (shown in dotted lines) in the proximity of the gray axis of the 3D-LUT is one eighth the size of the unit cube (shown in solid lines) in the peripheral region as shown in FIGS. 5 to 7, the upper bits to be used for calculation with the second address calculating unit 108 which targets the unit cube shown in solid lines in FIGS. 5 to 7 are one bit less in number than those to be used in the first address calculating unit 105 which targets the unit cube shown in dotted lines.

The second memory 109 constitutes 3D-LUTs adaptable to the proximity of the gray region including the gray axis, in the same manner as in the first memory 106, reads and stores 3D-LUT values which have been calculated with the second address calculating unit 108, stored in addresses of all eight endpoints (eight lattice points) and subjected to nonlinear transformation (processing). In the case of 3D-LUT shown in FIGS. 5 to 7, an interval between the lattice points read with the second memory 109 is twice the size of that read with the first memory 106. The weight calculating unit 110 calculates the position of the signals outside the gray proximate region in the cube subjected for interpolation including the signals outside the gray proximate region as weights adaptable to respective endpoints of this cube from the position (address) of the signal outside the gray proximate region and all the endpoints (addresses) of the cube subjected for interpolation including the position of the signals outside the gray proximate region itself.

In the case of the signals within the gray proximate region, the interpolation operating device 104 multiplies the transformed values at respective endpoints stored in the memory 106 of the first calculating device 102 by weights adaptable to respective endpoints on the basis of each endpoint and then obtains the summation of all of the thus multiplied values. Namely, in the interpolation calculating device 104, the sum of products of transformed values at all the endpoints and weights at all the endpoints is obtained. When the summation of weights at all the endpoints calculated in the weight calculating unit 107 is normalized as being 1, the summation of the multiplied values directly comes to be interpolation values which are aimed for. On the other hand, when it is not normalized, the summation of the multiplied values is divided by the summation of the weights to obtain the interpolation values. The thus obtained interpolation values are the transformed values to be aimed for in the nonlinear transforming device (nonlinear processing device) 100 and is outputted from the nonlinear transforming device 100 as the output signals.

In the above illustration, in the first and second address operating units 105 and 108, all of eight vertexes of the unit cube including the input signals are obtained; however, at least one vertex, its length and direction (direction or inclination of increase/decrease) of its side may be obtained. Moreover, in the first and second weight calculating units 107 and 110, weights adaptable to all of eight vertexes of the unit cube are obtained; however, the weight to the direction along each of R, G and B axes from at least one vertex may be obtained. The above are illustrative examples and the vertex and weight may be obtained in accordance with any adaptable interpolation methods. Any known interpolation methods are adaptable also to the invention.

In the above examples, the first and second memories 106 and 109 constitute 3D-LUTs from which the first and second address calculating units 105 and 108 read the values transformed with these 3D-LUTs. The invention is not limited to the above method and the first and second memories 106 and 109 may not constitute an LUT and be portions to store only addresses of all of eight endpoints calculated in the first and second address calculating units 105 and 108 whereupon the interpolation operating device 104 reads transformed values of addresses of all of the endpoints stored in the first and second memories 106 and 109 with reference to 3D-LUTs which are either of a built-in type or of an external type to obtain the sum of products of the thus read transformed values of addresses of all of the endpoints and the weights adaptable to all of the endpoints calculated in the first and second weight calculating units 107 and 110.

At the above example, in the nonlinear transforming device 100 which constitutes the LUT transforming devices 70a and 74a, the interpolation values are obtained by volume interpolation using 3D-LUT composed of three axes, that is, R, G and B axes. The invention is not limited to the above method and, if accuracy is sufficiently ensured, the interpolation values may be obtained by a straight-line interpolation using a one-dimensional (1D-) LUT of each of R, G and B axes as a LUT as well as using a segment of line and both endpoints of it as an interpolation unit region including the input signals and its endpoints. In another case, one-dimensional (1D-) LUT of any one axis of R, G and B axes and two-dimensional (2D-) LUT of the remaining axes are used as LUTs whereupon, in the case of 1D-LUT, the interpolation values are obtained as well by the straight-line interpolation while, in the case of 2D-LUT, the interpolation values may be obtained by volume interpolation using, for example, a square and its four vertexes as the interpolation unit region including the input signals and its endpoints.

The nonlinear transforming device 100 composing the LUT transforming devices 70a and 74a is essentially constituted as above. Its operation is now described below.

In the nonlinear transforming device 100 as shown in FIG. 8, the interpolation operation is performed in the interpolation operating device 104 based on either one of the following values depending on the result of discrimination by the gray region judging device 101: the values calculated by the first calculating device 102 when the input signals are judged as belonging to the proximity of the gray region and the values calculated by the second calculating device 103 when the input signals are judged as not belonging to the proximity of the gray region.

In other words, when the input signals are judged as not belonging to the gray proximate region, the second calculating device 103 calculates an address from upper bits of R, G and B in the second address calculating unit 108 in the similar way as in the case of the ordinary 3D-LUT to perform the interpolation operation in the interpolation operating device 104 using transformation data stored in the second memory 109 corresponding to the thus calculated address and the weights calculated in the second weight calculating unit 110. Calculations in the second calculating device 103 are corresponding to large unit cubes as shown in solid lines in FIGS. 5 to 7 so that the interpolation operations are performed using vertex position addresses of these large unit cubes in the interpolation operating device 104.

On the other hand, when the input signal is judged as belonging to the proximity of the gray region, the first calculating device 102 calculates in the first address calculating unit 105 an address from the upper bits of R, G and B which are denser than those used in the above calculation in the second calculating device 103 to perform the interpolation operations in the interpolation operating device 104 using the transformation data stored in the first memory 106 corresponding to the thus calculated address and the weights calculated in the first weight calculating unit 107. Calculations in the first calculating device 102 are corresponding to small unit cubes as shown in dotted lines in FIGS. 5 to 7 so that the interpolation operations are performed using vertex position addresses of these small unit cubes in the interpolation operating device 104.

In the above case, the above-described first and second weight calculating units 107 and 110 perform weighting calculation of so-called cube interpolation (volume interpolation) in which weights corresponding to a distance to each of R, G and B axis within the gray proximate region are preset.

In other words, in the present embodiment, in order to obtain the output signals corresponding to the input signals in accordance with outputs from the above-described first and second calculating devices 102 and 103, the interpolation operating device 104 performs the interpolation operations using vertex position addresses of either large unit cubes as usual when the input signals are judged as not belonging to the proximity of the gray region or small unit cubes which are denser than usual when the input signals are judged as belonging to the proximity of the gray region to perform an preferable color balance adjustment. The output signals to be outputted from the interpolation operating device 104 becomes output signals with the preferably adjusted color balance to be outputted from the nonlinear transforming device 100 and is outputted from each of the LUT transforming devices 70a and 74a.

The output signals outputted from the LUT transforming devices 70a and 74a are sent to MTX operating devices 70b and 74b respectively where output signals are subjected to chroma correction as described above. These operation results from respective MTX operating devices are sent to blocks 71 and 75 respectively where not only sharpening and dodging but also image correction or the like in accordance with operator's instructions, image data and the like is performed.

The image data transforming subsection 72 in the prescanned image processing section 64 is a site where the above-described image data obtained by processing with the processing subsection 70 is transformed with a three-dimensional (3D) LUT or the like into image data that corresponds to the representation on the display 20. The image data transforming subsection 78 in the fine scanned image processing section 66 is a site where the image data obtained by processing with the processing subsection 74 is similarly transformed with a 3D-LUT into output image data that corresponds to image recording with the printer 16, to which it is subsequently supplied.

The various conditions for the processing to be done by the prescanned image processing section 64 and the fine scanned image processing section 66 are set by the condition setting section 68.

The condition setting section 68 comprises an image processing condition setting subsection 82, a key correcting subsection 84 and a parameter coordinating subsection 86.

The image processing condition setting subsection (which is hereunder referred to as "setting subsection") 82 selects the image processing schemes to be performed; in addition, it uses the prescanned data to set the conditions for the image processing schemes to be done in the processing subsections 70 and 74 and supplies them into the parameter coordinating subsection 86.

Specifically, the setting subsection 82 uses the prescanned data to perform various operations including the construction of density histograms and calculation of various image characteristic quantities such as average density, large-area transmission density (LATD), highlights (minimum density) and shadows (maximum density). In addition, in response to an operator's instruction that is optionally entered from the manipulative unit 18, the setting subsection 82 determines image processing conditions as exemplified by the construction of tables (LUTs) for performing gray balance adjustment, lightness correction and contrast correction and the construction of matrix operational formulae for performing chroma correction.

The key correcting subsection 84 calculates the values of adjustment of image processing conditions (e.g. the values of correction of LUTs) typically in accordance with various instructions entered by means of keys on the keyboard 18a for adjusting the lightness, color, contrast, sharpness, chroma and so forth or by the mouse 18b; the key correcting subsection 84 then supplies the calculated values of adjustment into the parameter coordinating subsection 86.

After receiving the image processing conditions that have been set by the setting subsection 82, the parameter coordinating subsection 86 sets them in the processing subsection 70 of the prescanned image processing section 64 and in the processing subsection 74 of the fine scanned image processing section 66. Further, in accordance with the values of adjustment calculated by the key correcting subsection 84, the parameter coordinating subsection 86 either corrects (adjusts) the image processing conditions set in various parts or makes another setting of image processing conditions.

If, in the scanner 12, DX codes are read with the bar code reader 38 and encoded with the controller 46 or if the projected light from the film F is read and digitized with the CCD sensor and thereafter sent to the image processing apparatus 14, the CPU 54 reads the film type and the corresponding image processing conditions from the memory 56 and supplies them into the parameter coordinating subsection 86 in place of the image processing conditions that are set by the aforementioned setting subsection 82.

In the case just described above, the setting subsection 82 may or may not set image processing conditions. If the image processing conditions that are set in accordance with the information about the film type are to be substituted for the image processing conditions that are set by the setting subsection 82 on the basis of the acquired image data, the first mentioned image processing conditions may be directly supplied into the processing subsection 70 of the prescanned image processing section 64 and the processing subsection 74 of the fine scanned processing section 66 so that they are set in those processing subsections, eliminating the need to set image processing conditions by the condition setting section 68.

We now describe the color digital printer 10 of the embodiment under consideration in greater detail by explaining the actions of the image processing apparatus 14.

The operator sets the film F (or the frame to be subjected to image reading) in a specified position on the scanner 12 (or the carrier), completes specified jobs including the entry of the necessary information such as the size of the prints to be prepared, and thereafter keys in a command for starting print preparation. In response to the START command, the scanner 12 starts prescan and, as already mentioned, the image recorded on the film F is captured photoelectrically as R, G and B separations and output to the prescan memory 60.

When the prescanned data is stored in the prescan memory 60, the setting subsection 82 reads it out of the prescan memory 60, constructs density histograms, calculates image characteristic quantities and performs any other necessary operations to set image processing conditions (construct LUTs and MTXs) and send them to the parameter coordinating subsection 86.

In parallel with these steps, the stop-down value of the variable diaphragm 24 and other reading conditions for fine scan are determined and otherwise set so that the scanner 12 is adjusted accordingly. Then, the scanner 12 performs fine scan and the fine scanned data are sequentially transferred for storage in the fine scan memory 62.

Upon receiving the image processing conditions, the parameter coordinating subsection 86 sets them at specified sites (hardware) in the processing subsection 70 of the prescanned image processing section 64 and in the processing subsection 74 of the fine scanned image processing section 66.

Subsequently, the prescanned data is read out of the prescan memory 60, processed in the processing subsection 70 under the already set conditions and transformed in the image data transforming subsection 72 to image data corresponding to the representation on the display 20. The prescanned image that has been thusly subjected to specified processing is represented on the display 20.

In the ordinary process of print preparation, the operator looks at the representation on the display 20, checks (verifies) the image, or the result of the processing and, if necessary, manipulates the aforementioned adjustment keys on the keyboard 18a or the mouse 18b to adjust the color/density, gradation and other features of the image.

The inputs for this adjustment are sent to the key correcting subsection 84 which, in response to the entered inputs for adjustment, calculates the values of correction of the image processing conditions and sends them to the parameter coordinating subsection 86. In response to the supplied values of correction, the parameter coordinating subsection 86 corrects the LUT transforming devices 70a, 74a and MTX operating devices 70b, 74b for performing processing operations capable of reproducing the gray in a stable manner in the processing subsections 70 and 74 as already described above. In response to this corrective measure, or the inputs for adjustment entered by the operator, the image represented on the display 20 also varies.

If the operator concludes that the image being represented on the display 20 is appropriate (verification OK), he or she manipulates the keyboard 18a or the mouse 18b to give a command for print start. As a result, the image processing conditions are finalized and the fine scanned data is read out of the fine scan memory 62 and sent to the fine scanned image processing section 66.

If no image verification is to be performed, the image processing conditions are finalized at the point of time when the parameter coordinating subsection 86 ends setting of the image processing conditions in the processing subsection 74 of the fine scanned image processing section 66; the fine scanned data is then read out of the fine scan memory 62 and sent to the fine scanned image processing section 66.

Whether verification should be performed or not is preferably determined by selection of operative modes and so forth.

When the image data has been thusly read out to the fine scanned image processing section 66, it is processed as described above in the LUT transforming device 74a and MTX operating device 74b of the processing subsection 74 and subjected to other known necessary image processing schemes in the processing portion of the block 75; thereafter, the image data is sent to the image data transforming subsection 78, where it is transformed to image data that is suitable for image recording by the printer 16 to which it is then sent.

The printer 16 exposes a light-sensitive material (photographic paper) in accordance with the image data to record a latent image on it and develops and performs other treatments suitable for the light-sensitive material to output it as a (finished) print. To give one example of the printer's operation, the light-sensitive material is cut to a specified length in accordance with the size of the final print; thereafter, the printer records a back print and three light beams for exposure to R, G and B that are determined by the spectral sensitivity characteristics of the light-sensitive material are modulated in accordance with the image data (the image to be recorded); the three modulated light beams are deflected in the main scanning direction while, at the same time, the light-sensitive material is transported in the auxiliary scanning direction perpendicular to the main scanning direction so as to record a latent image; the latent image bearing light-sensitive material is subjected to a specified wet development process comprising color development, bleach-fixing and rinsing; the thus processed light-sensitive material is dried to produce a finished print; a plurality of prints thus produced are sorted and stacked.

While one embodiment of the present invention has been described above, it should be noted that the invention is by no means limited to that embodiment only and various improvements and modifications may of course be made without departing from the scope and spirit of the invention.

For example, the number of cubes which define the gray proximate region, that is, the proximity of the gray axis as shown in FIGS. 5 to 7 is not limited to 5. Moreover, the number of division of the cube in the proximity of the gray axis is not limited to 8 (i.e., the cube is divided into eight.) but may be larger than 8. Furthermore, the divided number of the cubes in the proximity of the gray axis may increases in the region closer to the gray axis and decreases in the region apart from the gray axis.

One modification relates to the image data to be input to the image processing apparatus of the invention and besides inputting the image as read photoelectrically from a photographic film, input image data from, for example, a digital camera and various other digital data supply sources may be advantageously used.

As described above in detail, the present invention provides an image processing apparatus that realizes a three-dimensional retrieving table (3D-LUT) which does not cause subtle variations different from its aim (untargeted) only with a small addition of memory capacity to the ordinary memory, thereby ensuring that the gray reproduction can be performed consistently and that photographic prints of high quality are produced in succession.

What is claimed is:

1. An image processing apparatus having nonlinear processing means for performing nonlinear processing on digital color signals,
    said nonlinear processing means comprising:
        gray region discriminating means for discriminating whether said digital color signals are present in a gray proximate region including gray signals; and
        region correspondence nonlinear processing means for performing the nonlinear processing differently in accordance with cases where said digital color signals are discriminated as signals inside the gray proximate region being present in the proximity of said gray signals or as signals outside the gray proximate region being not present in the proximity of said gray signals by said gray region discriminating means.

2. The image processing apparatus according to claim 1, wherein said region correspondence nonlinear processing means comprises:
    first processing means for calculating endpoints of a first interpolation unit region including said signals inside the gray proximate region as well as first interpolation weights of said signals inside the gray proximate region;
    second processing means for calculating endpoints of a second interpolation unit region including said signals outside the gray proximate region as well as second interpolation weights of said signals outside the gray proximate region; and
    interpolation processing means for performing interpolation processing using the endpoints of said first interpolation unit region and said first interpolation weights which have been calculated by said first processing means to obtain nonlinear processing output values of said signals inside the gray proximate region or for performing another interpolation processing using the endpoints of said second interpolation unit region and said second interpolation weights which have been calculated by said second interpolation processing means to obtain nonlinear processing output values of said signals outside the gray proximate region.

3. The image processing apparatus according to claim 1, wherein
    said first processing means comprises:
        first address calculating means for calculating first address output values of said signals inside the gray proximate region as data of the endpoints of said first interpolation unit region;
        first interpolation weight calculating means for calculating said first interpolation weights using said signals inside the gray proximate region; and
        first storing means for storing said first address output values obtained by said first address calculating means, and wherein
        said second processing means comprises:
            second address calculating means for calculating second address output values of said signals outside the gray proximate region as data of the endpoints of said second interpolation unit region;
            second interpolation weight calculating means for calculating said second interpolation weights using said signals outside the gray proximate region; and
            second storing means for storing said second address output values obtained by said second address calculating means.

4. The image processing apparatus according to claim 3, wherein said interpolation processing means performs the interpolation processing using the first address output values stored in said first storing means and the first interpolation weights calculated by said first interpolation weight calculating means when said digital color signals are discriminated as being present in said gray proximate region or perform the interpolation processing using the second address output values stored in said second storing means and the second interpolation weights calculated by said second interpolation weight calculating means when said digital color signals are discriminated as being not present in said gray proximate region, thereby obtaining said nonlinear processing output values.

5. The image processing apparatus according to claim 1, wherein said nonlinear processing means is three dimensional retrieving table transforming means for performing the nonlinear processing using a three dimensional retrieving table.

6. The image processing apparatus according to claim 5, wherein said digital color signals comprise three primary color signals of red, green and blue, wherein said interpolation processing means holds output signal values corresponding to each vertex of an cube composed of planes perpendicular to red, green and blue axes as data of the endpoints of said interpolation unit region in said three dimensional retrieving table, performs an interpolation operation of the output signal values corresponding to each vertex with interpolation weights corresponding to a position within said cube and wherein said cube in proximity of said gray signals, which is present inside said gray proximate region is rendered smaller in size than the cube in a periphery of said three dimensional retrieving table, which is present outside said gray proximate region.

7. The image processing apparatus according to claim 6, wherein a side of the cube in the proximity of said gray signals is half or less in the size of the side of the cube in said periphery.

8. The image processing apparatus according to claim 6, wherein said gray proximate region in the proximity of said gray signals is a region where total length from said gray signals as a center in each direction of the red, the green and the blue axes is within 5 pieces of cubes in said periphery.

9. The image processing apparatus according to claim 1, wherein said nonlinear processing means performs at least one nonlinear processing of color balance adjustment, lightness correction and contrast correction.

* * * * *